United States Patent [19]

Majestic et al.

[11] Patent Number: 5,151,220
[45] Date of Patent: Sep. 29, 1992

[54] CHEMICAL ABATEMENT OF CARBONATE CRACKING

[75] Inventors: Veronica K. Majestic, Stafford; Russell C. Strong, Richmond, both of Tex.

[73] Assignee: Nalco Chemical Company, Naperville, Ill.

[21] Appl. No.: 563,452

[22] Filed: Aug. 7, 1990

[51] Int. Cl.$^5$ .................. C23F 11/12; C23F 11/14
[52] U.S. Cl. .................. 252/392; 252/394; 252/396; 422/9; 422/12; 422/16
[58] Field of Search .................. 252/394, 392, 396; 422/9, 12, 16

[56] References Cited

U.S. PATENT DOCUMENTS

| | | | |
|---|---|---|---|
| 2,468,163 | 5/1950 | Blair, Jr. et al. | 252/8.555 |
| 2,659,731 | 11/1953 | Luvisi | 252/357 X |
| 2,773,879 | 12/1956 | Sterlin | 252/392 X |
| 2,945,821 | 7/1960 | Sterlin | 252/392 |
| 2,957,824 | 10/1960 | Chamot | 252/392 |
| 2,994,596 | 8/1961 | Sterlin | 252/392 |
| 3,037,937 | 6/1962 | Harris | 252/392 |
| 3,116,105 | 12/1963 | Kerst | 252/387 X |
| 3,369,004 | 2/1968 | Stanton | 525/347 |
| 3,502,578 | 3/1970 | Raifsnider | 252/391 |
| 4,105,582 | 8/1978 | Oguro | 252/392 |
| 4,332,967 | 6/1982 | Thompson et al. | 252/149 X |
| 4,347,154 | 8/1982 | Simmons | 252/392 X |
| 4,842,716 | 6/1989 | Kaplan et al. | 252/389.24 X |

FOREIGN PATENT DOCUMENTS

| | | |
|---|---|---|
| 0013669 | 1/1983 | Japan . |
| 809001 | 2/1959 | United Kingdom . |

OTHER PUBLICATIONS

Oil and Gas Journal, R. E. McGuire, p. 48, Jun. 1986 "Knowledge Is Key to Stress-Corrosion Battle".
Materials Performance, N.A.C.E., R. D. Merrick, p. 30, 1988 "Refinery Experiences With Cracking In Wet H$_2$S Environments".
National Association of Corrosion Engineers, R. N. Parkins, Aug. 1985 "An Overview—Prevention And Control Of Stress Corrosion Cracking".
NACE, New Orleans, La., Ciaraldi, et al., Apr. 1989 "Corrosion And Stress Corrosion Cracking Behavior Of Carbon-Steels in Monoethanolamine Solutions".
National Association of Corrosion Engineers, Rickert, et al., Jan. 1988 "Stress Corrosion Cracking Of Carbon Steel In Amine Systems".
Oil and Gas Journal, G. M. Buchheim, p. 92, Jul. 9, 1990 "Ways To Deal With Wet H$_2$S Cracking Revealed By Study".
Kirkothmer Chemical Encyclopedia, vol. 15, p. 749-752 1988.
Kirkothmer Encyclopedia, vol. 22, p. 531, Tall Oil 1988.
Imidazole and Its Derivatives, Part 1, K. Hofman, New York, Interscience Publishers, p. 220, 1952.
Information Services Literature Search Report, Search No. 2572 "Chloride Stress Corrosion Cracking on Stainless Steel", R. N. Parkins.
Corrosion 90, J. H. Kmetz and D. J. Truax, Chevron Corporation, Paper 206 "Carbonate Stress Corrosion Cracking Steel In Refinery FCC Main Fractionator Overhead Systems".

*Primary Examiner*—Deborah L. Kyle
*Assistant Examiner*—Valerie Fee
*Attorney, Agent, or Firm*—Robert A. Miller; Donald G. Epple

[57] ABSTRACT

A method of inhibiting carbonate stress corrosion cracking is determined to involve the addition of certain treatment chemicals to refinery process streams containing at least 1 of the volatile chemicals, ammonia, carbon dioxide, hydrogen sulfide, hydrogen cyanide, and water. The treatment chemical is preferably a fatty imidazoline compound or fatty amides or fatty esters or mixtures thereof.

The imidazoline compounds and the amide/esters are formed by reacting tall oil fatty acids, naphthenic acids, or mixtures thereof with essentially linear heterochemicals containing amine or alcohol functionality.

11 Claims, 1 Drawing Sheet

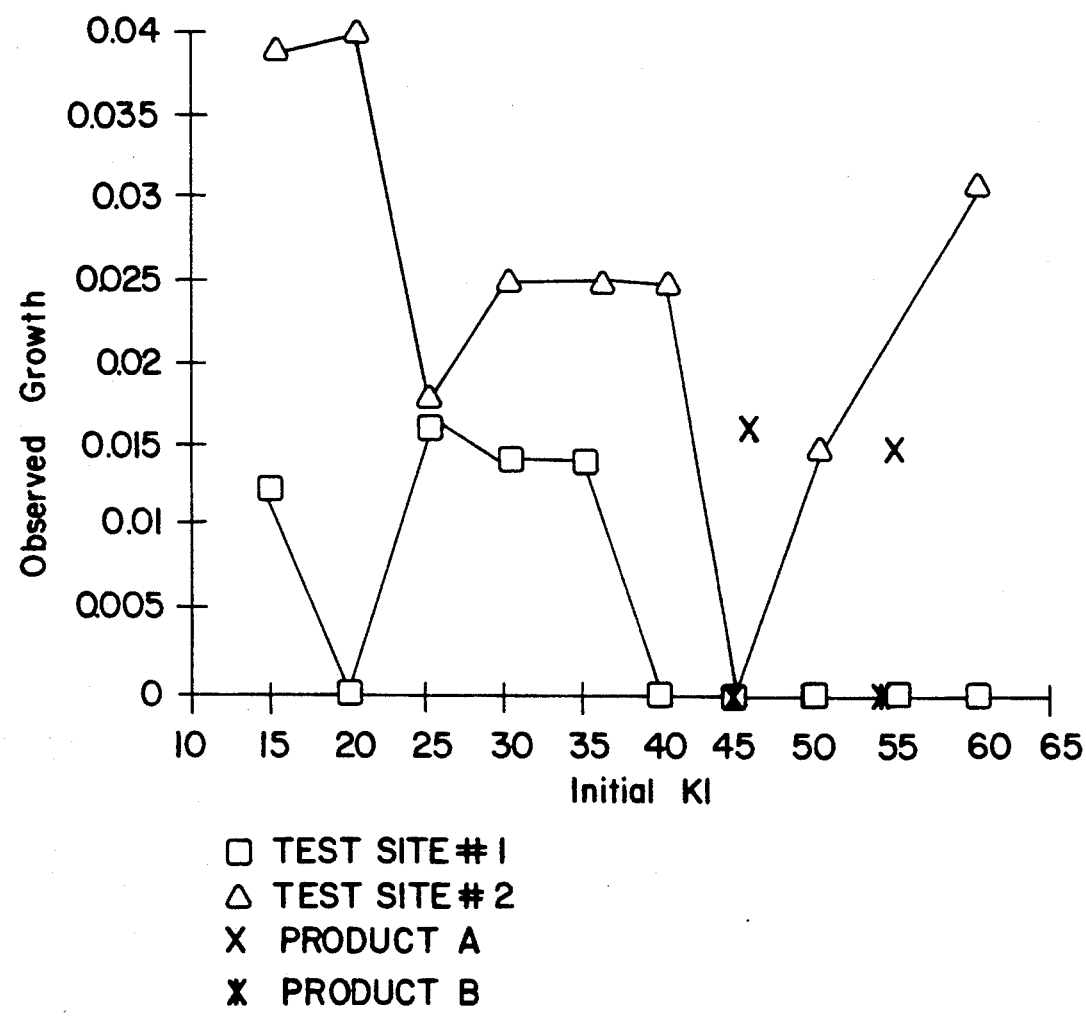

CHEMICAL ABATEMENT OF CARBONATE CRACKING

INTRODUCTION

Intergranular cracking and failure of carbon steel piping and vessels made of carbon steel which carbon steel occurs in various refinery overhead streams or other systems has been reported. These systems which are subject to stress corrosion cracking contain, in contact with the steels, the chemicals, hydrogen sulfide, ammonia, carbon dioxide, water, hydrogen cyanide and the like. The presence of these chemicals appear to contribute to carbonate stress corrosion cracking (hereafter carbonate SCC). This carbonate SCC phenomenon can put at risk those refinery operations in which it is occurring, and can in fact cause extremely dangerous and hazardous conditions in regard to stability of operations in these refineries.

A particular problem which has been observed and is related to intergranular carbonate SCC and failure of carbon steel either in piping or vessel construction, is in those steel piping and vessels contained in a fluid cracking catalyst fractionator overhead system, in which ammonia, hydrogen sulfide, carbon dioxide, hydrogen cyanide and water may be found.

This type of carbonate SCC is different from hydrogen blistering or hydrogen induced cracking because the microscopic examination of the cracks indicate the presence of iron oxides which are not present when hydrogen blistering and/or hydrogen induced cracking is present.

Although several potential approaches to controlling hydrogen induced cracking and hydrogen blistering have been recently suggested, there is no known solution to carbonate SCC.

OBJECTS OF THE INVENTION

It is therefore an object of this invention to provide for a method of inhibiting carbonate SCC of carbon steels exposed to refinery gaseous and/or liquid streams, which gaseous and/or liquid streams contain at least one of the chemicals ammonia, carbon dioxide, hydrogen cyanide, hydrogen sulfide, and water. This inhibition activity is accomplished by adding to the gaseous and/or liquid streams an effective amount of a treating agent obtained from the reaction products obtained by reacting hydrocarbonaceous carboxylic acids with various heterochemicals. By the term heterochemicals, we mean to include organic compounds containing, in addition to carbon and hydrogen, nitrogen and oxygen in the organic structure.

It is another object of this invention that the reaction products obtained from the reaction of hydrocarbonaceous carboxylic acids and heterochemicals are obtained by reacting a hydrocarbonaceous carboxylic acid having from about 8 to about 30 carbon atoms, with a heterochemical that is relatively linear in structure and contains at least one or more nitrogen groups, or contains at least one or more oxygen groups, or contains both nitrogen and oxygen groups.

Another object of the invention is to provide a method or inhibiting carbonate SCC of carbon steels by adding to liquid streams in contact with these carbon steels effective carbonate SCC inhibitory amounts of certain amides, esters or imidazolines, which amides, esters or imidazolines are formed under certain reaction conditions of the reaction between the hydrocarbonaceous carboxylic acids mentioned above and certain of the heterochemicals mentioned above.

It is a further object of this invention that the carbonaceous carboxylic acids used are chosen from the group consisting of tall oil fatty acids, naphthenic acids, or mixtures thereof and are reacted with heterochemicals chosen from the group consisting or glycol, diethylene glycol, triethylene glycol, ethanolamine ethylene diamine, diethylene triamine, amino ethyl ethanolamine, triethylene tetramine, mixtures thereof, and the like. When forming the amides, esters or imidazolines, it is preferable that the mole ratio of carboxylic acid to heterochemical range between about 0.25:1 to about 7.5:1.

It is another object of this invention to provide inhibitory amounts of a reaction product between hydrocarbonaceous carboxylic acids and heterochemicals which may or may not contain imidazolines, but in the absence of these imidazolines contain fatty amide compounds derived from the chemical reaction of the same hydrocarbonaceous carboxylic acids and heterochemicals described above. It is expected that these fatty amides also provide effective carbonate stress corrosion cracking inhibition.

Finally, it is an object of this invention to provide for a method of inhibiting carbonate SCC observed in carbon steels in contact with gases and/or fluids normally found in a fluid catalytic cracking unit main fractionator overhead system which comprises adding to the gases or fluids within this main fractionator system effective carbonate cracking inhibitory amounts of either the imidazoline, the amide, the ester or mixtures of the imidazoline, ester and amide formed by reacting a hydrocarbonaceous carboxylic acid having from 8 to about 30 carbon atoms with an essentially linear heterochemical to be later described in detail.

THE INVENTION

We have found a method of inhibiting carbonate Stress Corrosion Cracking (hereafter SCC) of carbon steels exposed to refinery gaseous and/or liquid streams which method comprises treating said refinery streams with an effective carbonate stress cracking inhibitory amount of the reaction product of hydrocarbonaceous carboxylic acid having from about 8 to about 30 carbon atoms, with a heterochemical having the structure:

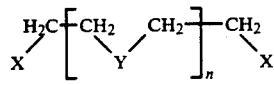

wherein

X is chosen from the group consisting of —NRH, —OH, and mixtures thereof;

Y is chosen from the group consisting of —NR—, —O—, and mixtures thereof;

R is chosen from the group consisting of H, $CH_3$, $C_2H_5$, $C_3H_7$, and mixtures thereof, and n ranges from about 0 to about 6;

and further wherein the hydrocarbonaceous carboxylic acid is reacted with the heterochemical in a mole ratio from about 0.25:1.0 to about 7.5:1.0, preferably from about 0.5:1.0 to about 5.0:1.0 and most preferably from about 0.5:1.0 to about 2.5:1.0.

THE CARBOXYLIC ACIDS

In practicing our method of inhibiting carbonate SCC, it has been found that the carboxylic acids useful in the invention contain from 8 to about 30 carbon atoms and may contain, in addition to at least one carboxylate acid functional group, or its salt, a hydrocarbonaceous substituent having from about 8 to about 30 carbon atoms and containing linear or branched alkyl groups, linear or branched alkylene groups, cyclic groups, aromatic groups, or any mixtures thereof. Preferably, these hydrocarbonaceous carboxylic acids are chosen from the group consisting of tall oil fatty acids, naphthenic acids, and mixtures thereof. Most preferably, and in the preferred mode of practicing the invention the carboxylic acid is chosen from the group consisting of mixtures of tall oil fatty acid and naphthenic acid, wherein the mixture contains from about a 20:80 weight ratio of tall oil fatty acid to naphthenic acid to about a 80:20 weight ratio of these same carboxylic acids.

Naphthenic acids have been described in Kirk Othmer Vol. 1 page 749, as carboxylic acids derived from petroleum during the refining of various distilled petroleum fractions, which acids are predominantly monocarboxylic acids. The main distinguishing structural feature of naphthenic acids is a hydrocarbon chain consisting of one or more cyclic rings, which rings may be alkylated in various positions with short aliphatic groups but which also contain either from the ring or more frequently from one of the pendant aliphatic groups, a carboxyl acid functional group. The cyclic rings may be cyclopentane or cyclohexane rings, but are predominantly cyclopentane rings. the predominate hydrocarbonaceous carboxylic acids present in naphthenic acid is described by the chemical structure below:

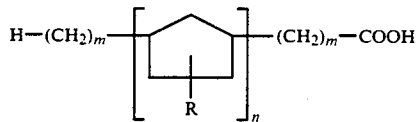

Wherein the number of fused rings, n, may range from 1 to about 5, the fused rings may be randomly distributed, and a small fraction of these rings may be cyclohexyl as well as cyclopental. The R group substituent pendent from the fused/cyclic rings are primarily small aliphatic groups, for example methyl, ethyl, propyl, and the like.

In the above formula, m independently, at both locations, normally is 1 or above, predominantly is greater than 1 and may range in total sum from between about 2 to about 20 or above. The naphthenic acids are primarily monocarboxylic acids and have been reported to have an average molecular weight ranging from around 240 to as high as 500, or above. Predominantly the average molecular weight is approximately 260-300. For further details in regard the naphthenic acid structures, reference is made to Kirk-Othmer Chemical Encyclopedia, Vol. 15, page 749-752.

Tall oil fatty acids are those fatty acids derived from tall oil, which is a natural product of pine trees, and which product is isolated by means of the Kraft pulping process. Again, details or tall oil fatty acids and their sources can be obtained from Kirk Othmer Encyclopedia, Vol. 22, page 531, et seq. The tall oil fatty acids are predominantly those acids which contain from 8 to about 30 carbon atoms, primarily from about 12 to about 24 carbon atoms and most predominantly contain approximately 16-20 carbon atoms. The tall oil fatty acids may contain straight chain mono- and/or multi-unsaturated fatty acids such as oleic acid and linoleic acid. These types of unsaturated acids are predominantly present in tall oil fatty acids.

These tall oil fatty acids exhibit chemistry expected of fatty acids derived from most any vegetable oil source and are primarily linear, long-chain, unsaturated acids which are pale yellow liquids at ambient temperature. They are predominantly insoluble in water and are soluble in most organic solvents, their chemistry being centered in the aliphatic substituent and carboxyl group and their alkylene unsaturation. Primary analysis of tall oil fatty acids shows that these fatty acids can contain, among other ingredients palmitic acid, palmitoleic acid, stearic acid, oleic acid, linoleic acid, pinolenic acid, eicosenoic acid and the like. However, the exact composition of these tall oil acids varies with source and supply.

THE HETEROCHEMICAL

The heterochemical useful to react with the hydrocarbonaceous carboxylic acids of the invention are heterochemicals having the structure:

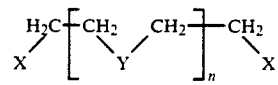

wherein

X is chosen from the group consisting of —NRH, —OH, and mixtures thereof;

Y is chosen from the group consisting of —NR—, —O—, and mixtures thereof;

R is from the group consisting of hydrogen, methyl, ethyl propyl and mixtures thereof, and n ranges from 0 to about 6, preferably from 0 to about 4, most preferably from 0 to 2.

The heterochemical is preferably chosen from the group consisting of glycol, diethylene glycol, triethylene glycol, ethanolamine, ethylene diamine, diethylene triamine, aminoethyl ethanolamine, triethylene tetramine and mixtures thereof. Most preferably the heterochemical is chosen from the group consisting of ethylene diamine, diethylene triamine, aminoethyl ethanolamine, and mixtures thereof.

In the preferred embodiment, the carbonate SCC inhibitory chemicals are obtained by reacting a mixture of tall oil fatty acids and naphthenic acids with either ethylene diamine, diethylene triamine, aminoethyl ethanolamine, or mixtures thereof.

REACTION CONDITIONS

The reaction conditions for reacting the carboxylic acid and the heterochemicals are shown in K. Hofman, *Imidazole and Its Derivatives*, Part 1, Interscience Publishers, New York, p. 220 1952 and C. M. Blau, et al, U.S. Pat. No. 2,468,163 (1949). These conditions basically involve mixing appropriate molar ratios of the carboxylic acid and the heterochemical in a vessel equipped with a condenser, a stirring mechanism and a heating source, and optionally equipped with an inert gas atmosphere. The chemicals are then combined and heated. Reacting these two chemicals at a reaction temperature ranging from about 70° C. up to and including about 210° C. for a time period necessary to form either an ester, amide or an imidazoline or mixtures thereof, depending on starting materials, achieves the carbonate SCC treatment chemicals of this invention. The reaction mixture can contain a number of different carboxylic acids, heterochemicals, and the products equally then contain amide esters or imidazoline structures, or mixtures thereof, each structure derived from obtaining different definitions of X, Y, n, R and R' as defined above and later.

This reaction is particularly effective and the corrosion inhibitory treatment chemicals are also particularly effective when the reaction is carried to an extent where an imidazoline is formed. The preferred imidazoline compounds are represented by the structure:

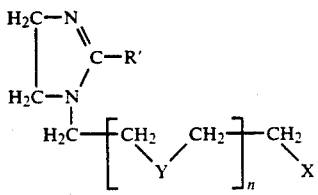

wherein, R, R', X, Y, and n have the meanings above.

Preferably, in this structure, R' is a hydrocarbonaceous group having from about 8 to about 30 carbon atoms and containing linear or branched alkyl groups, cyclic groups, aromatic groups, linear or branched alkylene groups or mixtures thereof. X, Y, and n, and R are all represented by the definitions given above.

Again, it is preferred that the reaction mixture be taken to temperatures and reacted for sufficient times to provide for condensation reactions forming imidazolines. When the carboxylic acids used are chosen from the group consisting of tall oil fatty acid, naphthenic acid, or mixtures thereof, and the heterochemical is chosen from a group consisting of ethylene diamine, diethylene triamine, triethylene tetramine, aminoethyl ethanolamine, and mixtures thereof, then the optimal carbonate SCC inhibition can be obtained.

In addition to the imidazoline compounds represented by the above structures, the amides or esters which can be obtained by the reaction of our 8-30 carbon atom carboxylic acids and the heterochemicals described above, can also act to inhibit carbonate SCC. These amides and/or esters, or mixtures thereof, or admixtures with the imidazoline and the amides/esters, can act to inhibit carbonate SCC.

The amides/esters which can be effective against carbonate SCC, by themselves or in admixture with the imidazolines described above, may be represented by the structures:

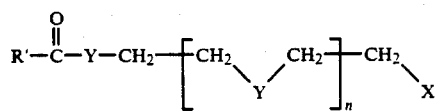

wherein X, Y, R', R, and n have the meanings described above.

The diesters, diamides, or amide-esters which may be possible by these reactions are also to be included, such as, but not limited to structures represented by:

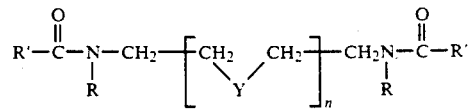

Again, wherein R', R, Y, and n have the meanings above.

Therefore, the reaction product may contain the imidazolines, the amides, the esters, the amide esters, or any admixture thereof and still be effective against carbonate stress corrosion cracking, The mixtures above can be effected by a number of variables, such as mole ratios of acid to heterochemical, reaction temperature, reaction times, and the like. The mole ratio of carbonaceous carboxylic acid to heterochemical ranges between about 0.25:1.0 up to about 7.5:1.0, preferably between 0.50:1.0 to about 5.0:1.0, and most preferably between about 0.5:1.0 to about 2.5:1.0. Imidazolines are maximized when the mole ratio of carboxylic acid to heterochemical is approximately 0.5:1.0 and the reaction temperatures are above about 100° C., preferably above about 150° C., most preferably at reaction temperatures between about 175° C. to about 210° C. At higher temperatures, with heterochemicals containing nitrogen, the imidazolines are formed.

DOSAGES

It is preferable that the effective amount of the reaction product obtained by reacting the hydrocarbonaceous carboxylic acids described above with the heterochemicals are at dosages which provide for anywhere from 1 ppm to about 1,000 ppm active reaction product, either in the form of the imidazoline or the amides or esters, or reaction mixtures thereof, based on the total amount of refinery streams being treated by these reaction products. Preferably the dosage ranges from about 2 to about 500 ppm active ingredient based on the refinery stream being treated, and most preferably the dosage range from about 5 to about 150 ppm.

To obtain optimum results, it is preferred to add the above dosages at the higher end initially and then maintenance dosages can be dropped to the lower end of the concentration mentioned above. As an example, a system would be expected to be optimized by treating with approximately 250-500 ppm of the reaction product which contains the imidazoline, the amide, the ester or ester amide, or mixtures thereof, based on refinery stream being treated, for the initial 24-72 hours of operation. Thereafter, the dosage treatment rate would be effectively dropped over a period of from 1 to about 10 days to a maintenance level ranging between from about 1 ppm to about 100 ppm, preferably from about 5 to about 50 ppm of the reaction product, based on the refinery stream being treated.

It is known and expected that the imidazoline compounds can act by themselves, as can the amide compounds. However, it is also expected that admixtures of the imidazoline and amide/ester compounds can be effective in any ratios. However, when these admixtures are present, the admixtures are preferably present at weight ratios of the imidazoline compounds to the amide/ester compounds ranging from about 100:1 to about 1:100, preferably from about 50:1 to 1:50.

Sometimes (occasionally) when the imidazoline compounds are used, they are used as an acid salt of another fatty acid or the same fatty acids that are used in the original reaction. When the fatty acids are present and a concentration of imidazoline salts is preferably concentrated in the formulation, it is common to add additional difunctional or multifunctional carboxylic acids so as to form multiple carboxylic acid salts of the imidazoline compounds. A person familiar with the art will understand that these multiple carboxylic acid compounds can neutralize, at each carboxyl group, one imidazoline ring structure described in the structure above. When the imidazoline also contains other amine functionality, additional acid may be necessary to neutralize this amine functionality.

THE REFINERY PROCESSES

The refinery process or streams which appear to enhance carbonate stress cracking corrosion are those processes or streams which can contain at least one, or more, of the chemicals: ammonia, hydrogen cyamide, carbon dioxide, hydrogen sulfide, water, or similar compounds which are somewhat volatile. Those process streams can include, but are not necessarily limited to, process streams handling the overhead vapors and condensate liquids from a fluid catalytic cracking unit. Particularly, it has been found that the process streams of the fluid catalytic cracking unit (FCCU) including, but not limited to, the FCCU Fractionator, any overhead condensors, fractionator reflux condensate drums/vessels, overhead accumulators, knock out drums, interstage coolers and/or condensors, deethanizers, debutanizer, depropanizers, and the like, and any pipelines, connectors, pumps and the like which may be connected with this type of operation.

The carbonate stress corrosion cracking is apparently diagnosed primarily by the presence of iron oxides in the cracks. This is compared to the reported absence of iron oxides in blisters or cracks caused by hydrogen gas invasion or hydrogen induced cracking. Therefore, apparently carbonate stress corrosion cracking is not the same as hydrogen induced cracking or blistering, although hydrogen blistering may also be observed in these same systems, particularly when hydrogen sulfide is present in the refinery streams.

To better describe our invention, the following tests are provided.

A reaction mixture, containing the appropriate mole ratios of tall oil fatty acid and naphthenic acid was added to a round bottom flask and mixed. Diethylene triamine was added to provide about one mole of diethylene triamine per mole of total carboxylic acid present. After the addition, the reaction was completed by heating to a temperature of about 200° C. for a period of approximately one hour or more. The reaction mixture contained a mixture of diethylene triamine, tall oil fatty acid, diethylene triamine/naphthenic acid imidazolines and the same amides formed by reacting diethylene triamine with this mixture of tall oil fatty acid and naphthenic acid. Tests indicated that no free carboxylic acids remained in the reaction mixture.

This material was further diluted to the desired concentration of about 10 weight percent with an aromatic solvent. This solvent compound admixture was then tested in a carbonate stress corrosion cracking test system. Simultaneously, a compound containing a free radical scavenger, thought to successfully convert ferric iron oxides to ferrous iron oxides, was also tested. The results are given in Table 1.

TABLE 1

| Sample Number | Initial KSI(in) | Final KSI(in) | Maximum Crack Length | Comments |
|---|---|---|---|---|
| 1 | 45 | 43.5 | 0.016" | Crack all way across |
| 2* | 45 | 44.3 | | No cracking |
| 3 | 55 | 50.6 | 0.015" | Crack all way across |
| 4* | 55 | 47.9 | | No cracking |

*Samples 2 & 4 contained the imidazoline containing compositions of this invention. Samples 1 and 3 contained a free-radical scavenger compound having no oleophilic character.

In Table 1, it is known that the initial KSI(in) and the final KSI(in) varied according to the test results. KSI(in) stands for Calculated Coupon Stress in thousand pounds per square inch. As can be seen the test results in Samples 2 and 4 provided for no cracking and minimal variation in the difference between the initial and final KSI.

The initial KSI ranged from 45 KSI in one set of conditions to 55 KSI in another set of conditions. Blank conditions with no additive present gave results at 45 KSI, which blank did not show any cracking and at 55 KSI the blank results were not recorded.

BRIEF DESCRIPTION OF FIG. 1

FIG. 1 provides for the cracking observed in a series of tests conducted without chemical additive. As can be seen, the blanks gave cracking at all conditions, before and after the conditions of the tests, so the blank showing no cracking is considered an anomaly and the chemicals of this invention have been demonstrated to inhibit carbonate SCC.

As can be seen from these results, the sample 2 and 4, which were the samples used from experiments described above, provided for no cracking and a difference between the initial and final KSI which indicated corrosion protection against carbonate corrosion stress cracking.

It is also interesting to note in FIG. 1 that samples loaded and stressed below 45 KSI(in) showed cracking, but the threshold value was not uniform. Again, this would indicate that our imidazoline/amide/ester corrosion inhibitors formed by the reactions above are very effective in stopping and preventing and/or at least inhibiting effectively the difficulties caused by carbonate stress cracking corrosion.

Having described our invention, we claim:

1. A method of inhibiting carbonate stress corrosion cracking of carbon steels exposed to refinery gaseous and/or liquid streams in a fluid catalytic cracking unit, which method comprises treating said fluid catalytic cracking unit refinery stream with an effective carbonate stress cracking inhibitory amount of the reaction product of a hydrocarbonaceous carboxylic acid having from about 8 to about 30 carbon atoms with a heterochemical having the structure:

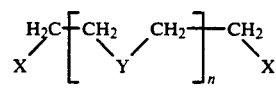

wherein:
X is chosen from the group consisting of —NRH, —OH, and mixtures thereof;
Y is chosen from the group consisting of —NR—, —O—, and mixtures thereof;

R is chosen from the group consisting of H, CH₃, C₂H₅, C₃H₇, and mixtures thereof, and n ranges from about 0 to about 6;

and further wherein the hydrocarbonaceous carboxylic acid is reacted with the heterochemical at a temperature ranging from 70° to 210° C. for at least one hour and in a mole ratio ranging from about 0.25:1.0 to about 7.5:1.0.

2. The method of claim 1 wherein the hydrocarbonaceous carboxylic acid is chosen from the group consisting of tall oil fatty acid, naphthenic acid, and mixtures thereof.

3. The method of claims 1 or 2 wherein the heterochemical is chosen from the group consisting of glycol, diethylene glycol, triethylene glycol, ethylene diamine, diethylene triamine, aminoethyl ethanolamine, triethylene tetramine, and mixtures thereof.

4. The method of claim 3 wherein the mole ratio of hydrocarbonaceous carboxylic acid to heterochemical ranges from about 0.50 to 1.0 to about 2.5 to 1.0

5. A method of treating carbon steels exposed to fluid catalytic cracking unit refinery gaseous/liquid streams containing at least one of the chemicals NH₃, CO₂, HCN, H₂S, and H₂O for the purpose of preventing carbonate stress corrosion cracking thereof, which method comprises treating said refinery gaseous/liquid streams with an effective amount for the purpose of one or more imidazoline compounds having the structure:

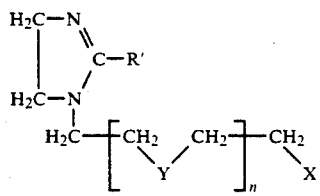

wherein:
R' is a hydrocarbonaceous group having from 8-30 carbon atoms and containing linear or branched alkyl groups, cyclic groups, aromatic groups, linear or branched alkylene groups, or mixtures thereof; and Y is from the group consisting of —NR—, —O—, or mixtures thereof;

X is from the group consisting of —NRH, —OH, or mixtures thereof; and n ranges from bout 0 to about 6; and R is H, CH₃, C₂H₅, C₃H₇ or mixtures thereof.

6. The method of claim 5 wherein the imidazoline compounds are formed from the reaction of a hydrocarbonaceous carboxylic acid chosen from the group consisting of tall oil fatty acid, naphthenic acid, or mixtures thereof; with a heterochemical chosen from the group consisting of ethylene diamine, diethylene triamine, triethylene tetramine, aminoethyl ethanolamine, and mixtures thereof.

7. The method of claims 5 or 6 wherein the fluid catalytic cracking unit refinery gaseous/liquid stream is from the overhead streams, or condensate streams derived therefrom.

8. A method of inhibiting carbonate stress corrosion cracking of carbon steels in a fluid catalytic cracking unit which comprises treating the feedstock to said unit with from about 1.0 ppm to about 1000 ppm, based on feedstock, of the reaction product obtained from reacting hydrocarbonaceous carboxylic acids having from 8-30 carbon atoms with heterochemicals represented by the structure:

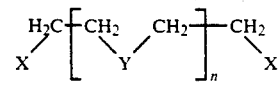

wherein:
X is chosen from —NRH, —OH, and mixtures thereof;

Y is chosen from —NR—, —O—, and mixtures thereof;

n is from 0-6; and

R is —H, —CH₃, —C₂H₅, —C₃H₇, and mixtures thereof, provided that the reaction of said carboxylic acid and heterochemical is completed at a temperature of from 70° C. to 210° C. for at least one hour and in a mole ratio of acid to heterochemical of from about 0.25:1.0 to about 7.5:1.0.

9. The method of claim 8 wherein the carboxylic acid is from the group consisting of tall oil fatty acid, naphthenic acid, and mixtures thereof; the heterochemical is from the group consisting of ethylene diamine, diethylene triamine, aminoethylethanol amine, triethylene tetramine, and mixtures thereof; the mole ratio of carboxylic acid to heterochemical is from about 0.5:1 to about 2.5:1.0, and further provided that the feedstock is treated with from about 2.0 to about 500 ppm of said reaction product.

10. A method of inhibiting intergranular carbonate stress corrosion cracking of carbon steels in contact with fluids in a fluid catalytic cracking unit main fractionator overhead system which comprises adding to the fluids an effective cracking inhibitory amount of an imidazoline having the structure:

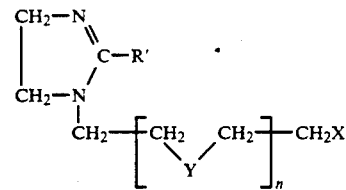

where R' is a hydrocarbonaceous group having from 8-30 carbon atoms and containing linear or branched alkyl groups, linear or branched alkylene groups, cyclic groups, aromatic groups, and mixtures thereof; and wherein Y is from the group —NR—, —O—, and mixtures;

X is from the group —NRH, —OH, and mixtures;

n is from 0 to 6; and

R' is from the group H, —CH₃, C₂H₅, C₃H₇, and mixtures thereof.

11. The process of claim 1, claim 8, or claim 10 wherein the fluid catalytic cracking unit refinery streams being treated have added thereto an effective amount of a treating agent consisting essentially of (a) an imidazoline having the structure:

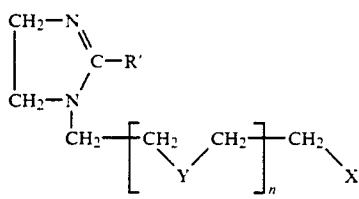

wherein R' has from 8-30 carbon atoms and contains linear and branched alkyl, linear and branched alkylene, cyclic, or aromatic groups, and mixtures thereof;
Y is —NR—, —O—, or mixtures thereof;
X is —NRH, —OH, or mixtures thereof;
R is H, CH, CH, and mixtures thereof;
n is from 0 to 4; and (b) an amide having the structure;

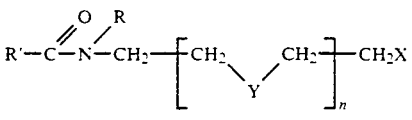

or

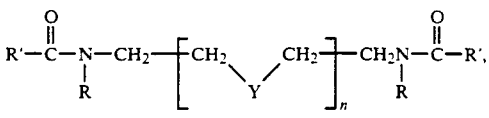

and mixtures thereof wherein R, R, Y and n have the meanings above;
(c) and mixtures thereof.

* * * * *